United States Patent [19]

Keeton et al.

[11] 4,276,719

[45] Jul. 7, 1981

[54] HERBICIDE ROLLER APPLICATION

[75] Inventors: John H. Keeton, Campbellsville; Lyle S. Keeton; Eugene G. Keeton, both of Trenton, all of Ky.

[73] Assignee: Keeton Enterprises, Inc., Campbellsville, Ky.

[21] Appl. No.: 117,514

[22] Filed: Feb. 1, 1980

Related U.S. Application Data

[63] Continuation-in-part of Ser. No. 101,567, Dec. 10, 1979.

[51] Int. Cl.³ .............................................. B05C 1/00
[52] U.S. Cl. ..................................... 47/1.5; 401/126;
15/210 R
[58] Field of Search .................... 47/1, 1.5; 401/118,
401/119, 121-131; 206/209, 209.1; 15/257.06,
210 R

[56] References Cited

U.S. PATENT DOCUMENTS

| 1,633,433 | 6/1927 | Boyer et al. | 222/584 |
|---|---|---|---|
| 2,528,657 | 11/1950 | Whiting | 121/167 |
| 2,584,042 | 1/1952 | Ober | 206/209.1 |
| 2,696,696 | 12/1954 | Tigerman | 47/1 |
| 2,784,434 | 3/1957 | Little | 401/122 |
| 2,790,984 | 5/1957 | Gilfin | 401/130 X |
| 3,009,189 | 11/1961 | Pappas | 401/127 |
| 3,146,806 | 9/1964 | Ginsburg | 141/110 |
| 3,232,006 | 2/1966 | Atherton et al. | 47/1.5 |
| 3,246,657 | 4/1966 | Roller | 401/119 |
| 3,837,749 | 9/1974 | Spatz | 401/130 |
| 3,925,927 | 12/1975 | Linton | 47/1.5 |
| 3,951,157 | 4/1976 | Idec | 401/130 X |
| 4,126,962 | 11/1978 | Polcaro | 47/1.5 |
| 4,189,245 | 2/1980 | Bennett | 401/126 |

Primary Examiner—Robert E. Bagwill
Attorney, Agent, or Firm—Cushman, Darby & Cushman

[57]  ABSTRACT

A liquid applicator device and a method of utilization thereof primarily for applying herbicide to plants. An elongated container has a closed first end and an opening in the second end through which a roller with fibrous covering is insertable and withdrawable. The roller has a handle extending from one end thereof and a closure structure is operatively associated with the handle for closing the opening in the container second end when the roller is within the container. The roller is mounted for coaxial rotation within the container, and a plurality of blades are mounted within the container around the internal periphery thereof, the blades interconnected by rings and also rotatable with respect to the container. Herbicide is placed in the container, the roller is inserted through the opening in the container second end, the roller (and blades) are rotated with respect to the container so that the herbicide is disposed on the roller, and then the roller is removed from the container by pulling on the handle and withdrawing it through the container second end opening. The roller may be then touched to plants that are desirably destroyed, and the roller may be reinserted and relative rotation effected until desired plant destruction is completed.

20 Claims, 4 Drawing Figures

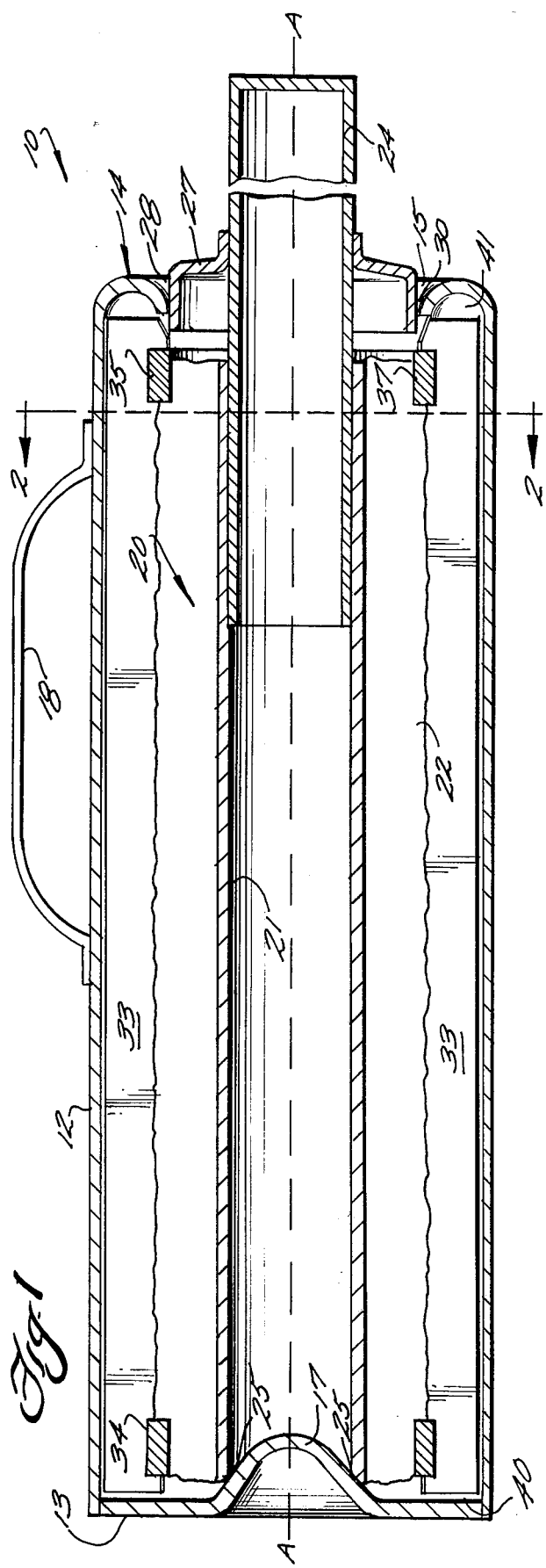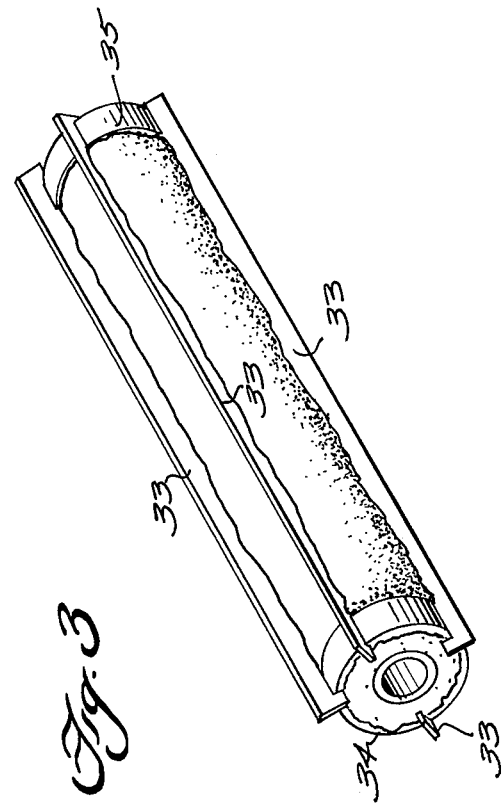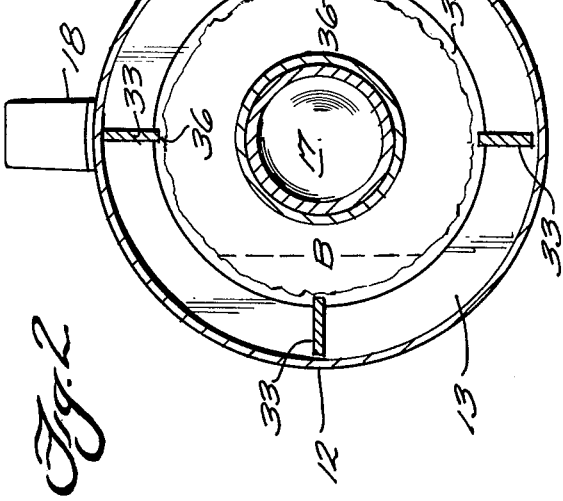

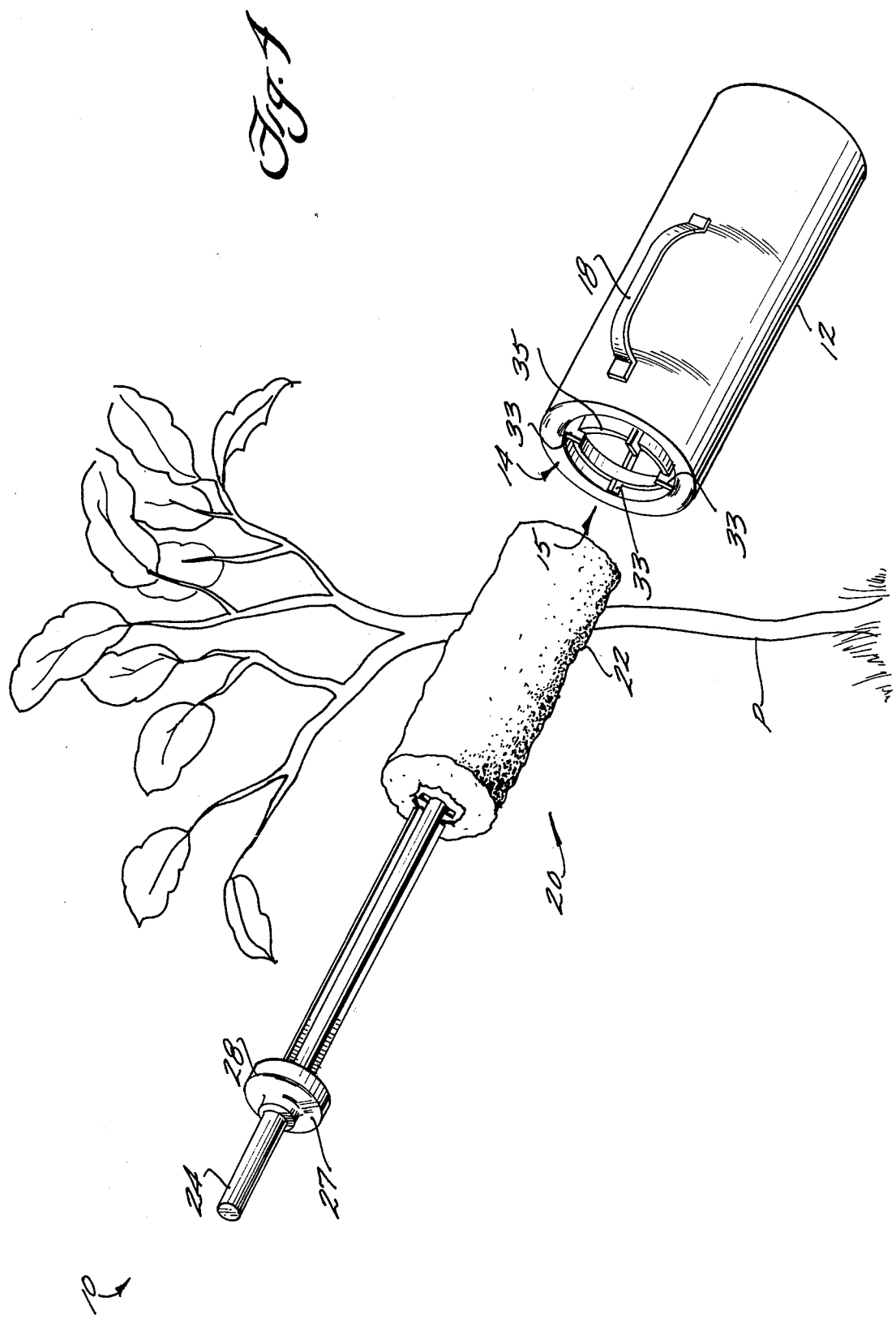

HERBICIDE ROLLER APPLICATION

CROSS REFERENCE TO RELATED APPLICATIONS

This application is a continuation-in-part of our application Ser. No. 101,567, filed Dec. 10, 1979 and entitled "HERBICIDE APPLICATION."

BACKGROUND AND SUMMARY OF THE INVENTION

In our copending application Ser. No. 101,567, filed Dec. 10, 1979, a device and method were provided for the application of liquid contact herbicides to undesirable plants. While the apparatus illustrated in said application Ser. No. 101,567, filed Dec. 10, 1979 (the disclosure of which is hereby incorporated by reference herein) is eminently suited for the application of liquid contact herbicides to undesirable plants. The structure is more sophisticated than is necessary for some uses. For instances, where professional farmers are to be applying the herbicide, there may be no real necessity for utilizing valve structure such as illustrated in said application Ser. No. 101,567.

According to the present invention a liquid applicator device and a method of utilization thereof are provided that are simpler yet can function effectively to safely apply herbicide to plants to be destroyed while positively preventing application to crop plants. According to one broad aspect according to the present invention, a liquid applicator device is provided which comprises a container elongated along an axis and having a first, closed end and a second end including means defining an opening therein. The device further comprises a roller elongated along an axis and having fibrous covering means for receiving liquid from the container and for ultimately transferring the liquid to another object, and having a cross-sectional area (including the covering means) smaller than the inside cross-sectional area of the container and smaller than the opening in the container second end. The roller includes a handle extending from one end thereof. Means are operatively associated with the roller for closing the opening in the container second end when the roller is in the container, and means are provided for mounting the roller within the container for rotation with respect to the container with the axis of the roller and the container coincident.

According to the specific preferred embodiment of the liquid applicator device of the invention, the first, closed end includes no valve opening or the like, but provides a surface cooperating with a surface formed on the roller end opposite the handle for facilitating the rotation of the roller with respect to the container. The rotational mounting means further comprise cooperating lips associated with the means defining the opening in the container second end and the means for closing that opening. Means are also provided mounted within the container for effecting distribution of liquid within the container onto the roller fibrous covering means. Such distribution effecting means preferably comprises a plurality of blades elongated in a direction parallel to the axis of the container, the blades each having an internal edge thereof which internal edges collectively define an opening having substantially the same cross-sectional area and shape as the roller, with means being provided for mounting the blades for rotation with the roller about the common axis, said rotational mounting means including a plurality of rings interconnecting the blades. One of the rings comprises a wiping ring excess liquid off the roller as the roller is withdrawn from the container, such ring being located adjacent the opening in the container second end.

According to another broad aspect of the present invention, a device is provided for holding a liquid and distributing liquid onto an article insertable therewithin and withdrawable therefrom. The device comprises a container elongated along an axis and substantially circular in cross-section with a first, closed end and a second end which includes means for defining an opening therein for insertion and withdrawal of the article into and from the container. A plurality of blades, elongated in a direction parallel to the axis of the container and mounted around the internal periphery of the container, are provided for rotation with respect to the container. The blades each have an internal edge thereof, which internal edges collectively define an open area that is circular in cross-section and concentric with the container. A plurality of rings interconnect the blades.

According to yet another broad aspect of the present invention, a method of destroying plants is provided. The method utilizes a liquid applicator device including a container elongated along an axis having a first, closed end and a second end with an opening therein; a roller with fibrous covering means, insertable and withdrawable into and from the container through the opening in the container second end, and having a handle extending from one end thereof; a closure structure operatively associated with the handle for closing the opening in the container second end when the roller is within the container; and structure for mounting the roller for coaxial rotation within the container. The method comprises the following steps: (a) Disposing liquid herbicide within the container so that it is partially filled with liquid. (b) Inserting the roller through the opening in the container second end until the closure structure closes the opening, with the handle sticking outwardly from the container. (c) Effecting relative rotation of the roller with respect to the container. (d) Removing the roller, with herbicide thereon, from the container by pulling on the handle and withdrawing the roller through the container second end opening. (e) Touching the roller covering means to plants that are desirably destroyed, so that herbicide is transferred from the roller to the plants to thereby result in destruction of the plants touched thereby; and (f) repeating steps (b) through (e) until desired plant destruction is completed, or until step (a) must be repeated.

The method according to the present invention may further be practiced utilizing a liquid applicator device which further includes a plurality of blades disposed within the internal periphery of the container and elongated in a direction parallel to the axis of the container and mounted for rotation therewithin. Then method step (c) is practiced by effecting relative rotation of the roller and the blades within the container for distribution of the herbicide onto the roller. The liquid applicator device may further include a plurality of rings holding the blades together, including a wiping ring located adjacent the opening in the container second end. Then step (d) is accomplished by effecting wiping of excess herbicide off of the roller with the wiping ring as the roller is withdrawn from the container.

It is the primary object of the present invention to provide a simple and effective liquid applicator device, and method of utilization thereof for destroying plants. This and other objects of the invention will become clear from an inspection of the detailed description of the invention and from the appended claims.

BRIEF DESCRIPTION OF THE DRAWINGS

FIG. 1 is a cross-sectional view of an exemplary liquid applicator device according to the present invention;

FIG. 2 is a sectional view of the device of FIG. 1 taken along lines 2—2 of FIG. 1, with the roller removed for clarity;

FIG. 3 is a perspective view of the wiping blade assembly utilizable in the FIG. 1; and FIG. 4 is an exploded perspective view of the device of FIG. 1.

DETAILED DESCRIPTION OF THE DRAWINGS

An exemplary liquid applicator device according to the present invention is illustrated generally at 10 in the drawings. The device includes a container 12 elongated along an axis A—A and having a first, closed end 13, and a second end 14, including means defining an opening 15 therein. The closed end 13 may be provided with a valve opening or the like, such as is provided in a corresponding structure in parent application Ser. No. 101,567, filed Dec. 10, 1979 (the disclosure of which is hereby incorporated by reference herein), but as illustrated in the drawings preferably is unapertured although having a central surface portion 17 thereof projecting into the interior of the container 12. A handle 18 preferably is mounted on the container side walls for facilitating carrying of the container from place to place.

The device 10 further comprises a roller 20 elongated about an axis (A—A) and having a support 21 for a fibrous covering means 22. The fibers may be of any suitable conventional type, synthetic or natural, disposed in a suitable configuration. The roller includes a handle 24 extending from one end thereof, and a surface 25 (the interior edge of the hollow support 21) for cooperating with the surface 17 of the container end 13 to keep the roller 20 centerd in the container, and facilitate rotation thereof with respect to the container. The handle 24 may be telescopic (as illustrated in FIG. 4 and disclosed in parent application Ser. No. 101,567, filed Dec. 10, 1979), or rigid with respect to the support 21. The roller 20 has a cross-sectional area, including the covering means 22, smaller than the inside cross-sectional area of the container 12, and smaller than the cross-sectional area of the opening 15 so that the roller 20 is insertable into and withdrawable from the container 12 through the opening 15.

Means are operatively associated with the roller 20 for closing the opening 15 when the roller is in the container 12. Such means preferably comprises a structure mounted on the handle 24, such as a disk 27 attached to the handle 24 and having a first annular lip 28 extending therefrom and elongated in a direction parallel to the axis A—A. The second end 14 of the container 12 includes an annular wall portion 30 of the container 12 turned back toward the container first end and having an inside diameter substantially the same as the outside diameter of the annular lip 28. The wall portion 30 and the annular lip 28 are of compatible materials which allow a seal to be effected between the lip 28 and the wall portion 30 when the roller 20 is in the position illustrated in FIG. 1, whereby leakage of liquid within the container 12 through the opening 15 is prevented. The structure 27, 28 thus comprises a closure member for the opening 15.

The roller 20 when received by the container 12 is mounted for rotation with respect to the container, with the axis of the roller 20 and container 12 coincident (axis A—A). Means for mounting the roller for such rotation include the elongated annular lip 28 and annular wall portion (lip) 30, as well as the cooperating surfaces 17, 25. As the roller 20 is rotated about the axis A—A, liquid herbicide within the container 12 will be distributed onto the fibrous covering means 22.

Preferably means are mounted within the container 12 for effecting even distribution of liquid within the container onto the roller fibrous covering means 22. Such means are most clearly illustrated in FIGS. 1 through 3 and include a plurality of blades (e.g. four) 33 elongated in a direction parallel to the axis A—A and mounted around the internal periphery of the container (but not attached thereto), the blades being interconnected by a plurality of rings, such as rings 34 and 35. The blades each have an internal edge 36 thereof, which internal edges collectively define an open area having substantially the same cross-sectional area and shape (circular) as the roller 20 including the fibrous covering means 22. This is indicated by dotted line B in FIG. 2. Means are also provided for mounting the blades 33 for rotation with the roller 20, and with respect to the container 12, about the axis A—A. Such rotation mounting means include the rings 34, 35, and the turned back annular wall portion 30 of the container second end, as illustrated in FIG. 1.

To ensure that any excess liquid is wiped off the roller 20 before it is withdrawn from the container 12, it is desired to form the ring 35, which is adjacent the opening 15, as a wiping ring (that is having an internal surface 37 thereof interior of the blade edges 36).

The preferred use of the device 10 is for the application of herbicide, such as ROUNDUP, to selected plants for the destruction of the plants. In practicing a method of destroying plants utilizing the device 10, first a quantity of liquid herbicide is poured into the container 12 through the opening 15. A relatively small volume is disposed within the container 12, so that it is only partially filled with liquid. Then the roller 20 is inserted through the opening 15 until the closure structure 27, 28 closes the opening 15, with the handle 24 sticking outwardly from the container (to the position illustrated in FIG. 1). Then relative rotation of the roller with respect to the container is effected. Preferably the container 12 is positioned at this time so that the axis A—A is generally horizontal, although it may also assume other orientations.

Relative rotation of the roller 20 with respect to the container 12 (accomplished by rotating the handle 24, which is either keyed or rigidly attached to the roller support 21, with respect to the container 12) also effects rotation of the blades 33 with respect to the container. The blades 33 slosh the liquid over the fibrous covering means to generally evenly distribute the liquid herbicide onto the fibrous covering means 22. Gaps 40, 41, may be provided at either end of the blades 33 in roller 20 to allow liquid to flow therethrough during the relative rotation.

After a relative rotation between the roller 20 and the container 12, the roller 20, with herbicide thereon, is withdrawn from the container 12 by pulling on the handle and withdrawing the roller through the opening 15. As the roller 20 is withdrawn through the opening 15, the surface 37 of the wiping ring 35 wipes excess herbicide off of the roller, depositing it back into the container 12. Then the roller covering means 22 is touched to any plants that are desirably destroyed (as illustrated in FIG. 4) so that herbicide is transferred from the roller 20 to the plants P to thereby result in destruction of the plants touched thereby. The above steps are repeated until desired plant destruction is completed. Ultimately when all of the herbicide is used up, another small amount of herbicide may be poured into the container 12, and the entire sequence again repeated. The handle 18 facilitates carrying of the container 12 and allows ready steadying of the container 12 while the handle 24 is being rotated.

It will thus be seen that according to the present invention a liquid applicator device is provided that prevents excessive loss of herbicide due to evaporation while the applicator is in transit or between uses, yet allows simple and effective application of contact herbicide directly to plants. The method of utilization thereof also is extremely simple and effective.

While the invention has been herein shown and described in what is presently conceived to be the most preferred and practical embodiments thereof, it will be apparent to those of ordinary skill in the art that many modifications may be made thereof within the scope of the invention, which scope is to be accorded the broadest interpretation of the appended claims so as to encompass all equivalent all devices and methods.

What is claimed is:

1. A liquid applicator comprising
   a container elongated along an axis and having a first, closed end, and a second end including means defining an opening therein;
   a roller elongated along an axis and having fibrous covering means for receiving liquid from said container and for ultimately transferring the liquid to another object, and having a cross-sectional area, including said covering means, smaller than the inside cross-sectional area of said container and than said opening in said container second end; said roller including a handle extending from one end thereof;
   means operatively associated with said roller for closing said opening in said container second end when said roller is in said container; and
   means for mounting said roller within said container for relative rotation with respect to said container with the axes of the roller and container coincident.

2. A device as recited in claim 1 wherein said means for mounting said roller for rotation within said container comprises cooperating lips of said means defining an opening in said container, and said means operatively associated with said roller for closing said opening.

3. A device as recited in claim 2 wherein said means for mounting said roller for rotation further comprises cooperating surfaces formed on said container first end, and on said roller on the end thereof opposite said handle.

4. A device as recited in claim 2 wherein said cooperating lip of said means operatively associated with said roller for closing said opening comprises a first annular lip elongated in a direction parallel to the axis of said container and said roller, and extending from a disc affixed to said roller handle; and wherein said cooperating lip of said means defining an opening in said container second end comprises an annular wall portion of said container turned back toward said container first end and having an inside diameter substantially the same as the outside diameter of said first annular lip.

5. A device as recited in claim 1 further comprising means mounted within said container for effecting generally even distribution of liquid within said container onto said roller fibrous covering means.

6. A device as recited in claim 5 wherein said means for effecting distribution of liquid within said container onto said roller fibrous covering means comprises a plurality of blades elongated in a direction parallel to the axis of said container and mounted around the internal periphery of said container, said blades each having an internal edge thereof which internal edges collectively define an open area having substantially the same cross-sectional area and shape as said roller including said fibrous covering means.

7. A device as recited in claim 6 further comprising means for mounting said blades for rotation with said roller about said axis.

8. A device as recited in claim 7 wherein said means for mounting said blades for rotation comprises a plurality of rings interconnecting said blades.

9. A device as recited in claim 8 wherein said means for mounting said blades for rotation further comprises a turned-back portion of said container second end.

10. A device as recited in claim 8 further comprising means for wiping excess liquid off said roller as said roller is withdrawn from said container, said means comprising one of said rings interconnecting said blades, said ring located adjacent said opening in said container second end.

11. A device for holding a liquid and distributing liquid onto an article insertable therewithin, and withdrawable therefrom, said device comprising
    a container elongated along an axis and being substantially circular in cross-section and having a first, closed end, and a second end which includes means for defining an opening therein for insertion and withdrawal of an article into and from said container;
    a plurality of blades elongated in a direction parallel to the axis of said container and mounted around the internal periphery of said container for relative rotation with respect to said container, said blades each having an internal edge thereof which internal edges collectively define an open area that is circular in cross-section and concentric with said container; and
    a plurality of rings interconnecting said blades.

12. A container as recited in claim 11 wherein one of said rings is mounted adjacent said opening defined in said container second end.

13. A method of destroying plants utilizing a liquid applicator device including a container elongated along an axis and having a first, closed end, and a second end with an opening therein; a roller with fibrous covering means insertable and withdrawable into and from the container through the opening in the container second end, and having a handle extending from one end thereof; a closure structure operatively associated with the handle for closing the opening in the container second end when the roller is within the container; and structure for mounting the roller for relative coaxial rotation with respect to the container; said method comprising the steps of:

(a) disposing liquid herbicide within the container so that it is partially filled with liquid;
(b) inserting the roller through the opening in the container second end until the closure structure closes the opening, with the handle sticking outwardly from the container;
(c) effecting relative rotation of the roller with respect to the container;
(d) removing the roller, with herbicide thereon, from the container by pulling on the handle and withdrawing the roller through the container second end opening;
(e) touching the roller covering means to plants that are desirably destroyed, so that herbicide is transferred from the roller to the plants to thereby result in destruction of the plants touched thereby; and
(f) occasionally repeating steps (b)–(e) until desired plant destruction is completed, or until step (a) must be repeated.

14. A method as recited in claim 13 wherein the liquid applicator device further includes a plurality of blades disposed within the internal periphery of the container and elongated in a direction parallel to the axis of the container, and mounted for rotation within the container; and wherein said method step (c) is practiced by effecting relative rotation of the roller and the blades within the container for distribution of the herbicide onto the roller fibrous covering means.

15. A method as recited in claim 14 wherein the liquid applicator device further includes a plurality of rings holding the blades together, including a wiping ring located adjacent the opening in the container second end; and wherein said method step (d) is accomplished by effecting wiping of excess herbicide off of the roller with the wiping ring as the roller is withdrawn from the container.

16. A liquid applicator comprising:
a container elongated along an axis having first, closed end, and a second end including means defining an opening therein;
a roller elongated along an axis and having fibrous covering means for receiving liquid from said container and for ultimately transferring liquid to another object, and having a diameter, including said covering means, smaller than the inside diameter of said container and a said opening in said container second end; and including a handle extending therefrom; and
a wiping ring mounted interiorly of said container near said opening in said container second end for wiping excess liquid off said fibrous covering means as said liquid applicator structure is withdrawn from said container; said roller fibrous covering means having an outside diameter slightly larger than the diameter of the opening in said wiping ring.

17. A liquid applicator as cited in claim 16 further comprising means associated with said wiping ring for allowing excess liquid removed thereby to drain back into said container.

18. A liquid applicator as cited in claim 17 further comprising means operatively associated with said handle for closing said opening in said container second end when said roller is in said container.

19. A method of destroying plants utilizing a liquid applicator device including a container elongated along an axis and having a first, closed end, and a second end with an opening therein; the liquid applicator structure including a fibrous exterior portion for receiving and holding herbicide from said container and having a cross-sectional area, including the exterior fibrous portion, smaller than the inside cross-sectional area of the container and including a handle extending from one end thereof; and a wiping structure mounted in the container for wiping excess liquid from fibrous exterior portion when withdrawn from the container; said method comprising the steps of:
disposing liquid contact herbicide within the container so that it is partially filled with liquid;
inserting the liquid applicator structure fibrous exterior portion through the opening in the container second end so that it engages liquid disposed within the container, with the handle sticking outwardly from the container;
removing the liquid applicator structure, with herbicide thereon, from the container by pulling out the handle and withdrawing the fibrous exterior portion through the container second end opening with the wiping structure engaging the fibrous exterior portion and removing excess liquid therefrom; and
touching the fibrous exterior portion of the liquid applicator structure to plants that are desirably destroyed so that herbicide is transferred from the fibrous exterior portion to the plants to thereby result in destruction of the plants touched thereby.

20. A method as recited in claim 19 wherein during withdrawal of the liquid applicator structure from the container excess liquid removed by the wiping structure drains back into the container.

* * * * *